United States Patent [19]
Pflügl et al.

[11] Patent Number: 5,925,165
[45] Date of Patent: *Jul. 20, 1999

[54] PROCESS AND APPARATUS FOR THE 3-STAGE TREATMENT OF SOLID RESIDUES FROM REFUSE INCINERATION PLANTS

[75] Inventors: Karl Heinz Pflügl, Weinböhla; Norbert Kiethe, Friedewald, both of Germany; Ernst Hugentobler, Wermatswil, Switzerland; Hans Rüegg, Wohlen, Switzerland; Ruedi Frey, Effretikon, Switzerland; Anton Mayer, Leoben, Austria; Theo Rey, Aarau; Alfred Edlinger, Baden, both of Switzerland

[73] Assignees: Von Roll Umwelttechnik AG, Zurich; Holderbank Financiere Glarus AG, Glarus, both of Switzerland

[ * ] Notice: This patent is subject to a terminal disclaimer.

[21] Appl. No.: 08/648,003

[22] PCT Filed: Sep. 14, 1995

[86] PCT No.: PCT/CH95/00204

§ 371 Date: May 22, 1996

§ 102(e) Date: May 22, 1996

[87] PCT Pub. No.: WO96/10097

PCT Pub. Date: Apr. 4, 1996

[30] Foreign Application Priority Data

Sep. 29, 1994 [CH] Switzerland .............................. 2945/94

[51] Int. Cl.⁶ .............................. C21B 11/10; C21B 3/04; F23J 3/00; F27D 3/00

[52] U.S. Cl. .......................... 75/10.41; 75/10.1; 75/10.14; 75/10.35; 75/10.39; 75/10.4; 75/10.42; 75/10.46; 75/10.62; 75/10.65; 75/392; 75/746; 75/760; 75/961; 110/165 A; 110/218; 110/250; 110/344; 266/205; 266/215; 266/227; 266/229; 373/78; 373/79; 373/82; 373/83

[58] Field of Search ..................... 110/342, 344, 110/346, 218, 250, 255, 259, 210, 211, 212, 214, 165 A; 588/201; 126/263.01; 432/5, 13, 21, 67, 70, 71, 94, 207, 209, 217, 247; 75/414, 10.1, 10.14, 10.17, 10.23, 10.42, 10.4, 10.24, 10.35, 10.36, 10.39, 10.41, 10.45, 10.46, 10.62, 10.65, 392, 403, 746, 751, 760, 961; 266/200, 205, 215, 227, 229, 232, 900; 373/30, 31, 33, 78, 79, 82, 83, 85, 86

[56] References Cited

U.S. PATENT DOCUMENTS

| | | | |
|---|---|---|---|
| 978,465 | 12/1910 | Louvrier | 373/72 |
| 1,552,555 | 9/1925 | Grauel | 373/31 |
| 2,512,761 | 6/1950 | Arbeit | 65/135.8 |
| 2,862,810 | 12/1958 | Alexandrovsky | 75/556 |
| 3,378,618 | 4/1968 | Vach et al. | 373/31 |
| 3,420,510 | 1/1969 | Griem, Jr. | 432/13 |
| 3,617,042 | 11/1971 | Nakagawa | 266/215 |
| 3,901,489 | 8/1975 | Suzuki et al. | 266/162 |
| 3,968,756 | 7/1976 | Yamada | 110/342 |
| 4,144,311 | 3/1979 | Grosche et al. | 423/155 |
| 4,211,556 | 7/1980 | Nagano et al. | 75/10.4 |
| 4,787,320 | 11/1988 | Raaness et al. | 110/250 |
| 4,824,362 | 4/1989 | Kimura et al. | 432/13 |
| 4,831,943 | 5/1989 | Aune | 110/346 |
| 4,848,250 | 7/1989 | Wunderley | 110/235 |
| 4,850,577 | 7/1989 | Yamaoka | 266/229 |
| 5,005,493 | 4/1991 | Gitman | 110/246 |
| 5,259,863 | 11/1993 | Schneider et al. | 75/414 |
| 5,269,235 | 12/1993 | McGill et al. | 110/246 |
| 5,301,620 | 4/1994 | Nagel et al. | 110/346 |
| 5,500,870 | 3/1996 | Konig et al. | 373/78 |
| 5,511,496 | 4/1996 | Schoener et al. | 110/346 |
| 5,653,182 | 8/1997 | Sorvik | 110/250 |
| 5,666,891 | 9/1997 | Titus et al. | 110/250 |
| 5,733,356 | 3/1998 | Konig et al. | 75/10.29 |

FOREIGN PATENT DOCUMENTS

| | | | |
|---|---|---|---|
| 0 417 520 A1 | 3/1991 | European Pat. Off. . | |
| 245160 | 5/1967 | U.S.S.R. . | |
| 1749628 A1 | 7/1992 | U.S.S.R. . | |
| 214648 | 7/1925 | United Kingdom | 373/72 |
| 473111 | 11/1936 | United Kingdom . | |
| WO 95/04899 | 2/1995 | WIPO | F23G 5/00 |

OTHER PUBLICATIONS

"Müllverbrennung und Umwelt" [Refuse incineration and the environment], vol. 4, by Prof. Dr. Ing. Karl J Thomé–Kozmiensky from EF Verlag für Energie und Umwelttechnik GmbH, Berlin (1990), pp. 339–359.

*Primary Examiner*—Ira S. Lazarus
*Assistant Examiner*—Ljiljana V. Ciric
*Attorney, Agent, or Firm*—Oblon, Spivak, McClelland, Maier & Neustadt, P.C.

[57] ABSTRACT

In a method for processing solid residues from refuse incineration plants the slag is melted and heavy metals from the melt (16) are separated for reutilization. The slag is directly transferred from the refuse incineration plant into a first heating chamber (2) and melted there under oxidizing conditions. The melt (16) produced therefrom is transferred to a second heating chamber (3), in which the heavy metal compounds are reduced to their metallic form. Furthermore, additional finely divided residues, such as fly ash, boiler ash and filter dust, are introduced into the second heating chamber (3) via a hollow graphite electrode (19). The melt (16) is then passed on to a third heating chamber (4), in which the residual readily volatile metals are vaporized and the residual non-volatile metals are sedimented. The essentially heavy-metal-free melt is then cooled to form vitreous granules.

25 Claims, 2 Drawing Sheets

PROCESS AND APPARATUS FOR THE 3-STAGE TREATMENT OF SOLID RESIDUES FROM REFUSE INCINERATION PLANTS

The invention relates to a method for processing solid residues, such as slag, fly ash and filter dusts, from refuse incineration plants and an apparatus for carrying out the method.

In refuse incineration plants, approximately 30 to 35% of the amount of refuse incinerated results as slags. In this slag, up to 5% of unburnt organic constituents and about 5 to 10% of various metals, principally iron, are still present. Currently, the slag, after an appropriate mechanical treatment, is landfilled or used in civil engineering, e.g. road building as base material. Other, finer solid residues such as fly ash and boiler ash and filter dust must be disposed of separately and are taken for this purpose to special landfills. Further treatment of these wastes does not generally take place. Unburnt organic fractions and water-soluble heavy metal compounds in the slag lead to additional problems in reuse or storage, since they lead to impermissible pollution of waters.

Conversion of the solid residues from the refuse incineration plants by fusion into a vitreous state eliminates the disadvantages of the environmentally polluting crude slag. In the fusion process, the organic constituents are burnt and the heavy metals still remaining and other environmentally polluting wastes are incorporated into a water-insoluble glass matrix. The fusion operation is performed in conventional glass-melting plants, for which, however, a complex treatment of the crude slag is necessary, the iron, inter alia, having to be removed via magnetic separators and the slag having to be crushed and classified. The glass produced as granules in this method was still used in building until recently. Because of the higher requirements of environmental protection, granules of this type may no longer be readily used for building purposes, such as for road building.

Various proposals have already been made to solve these problems. For example, fundamental considerations on rendering residues inert, in particular metals and heavy metals, by melt processes can be taken from the standard work "Müllverbrennung und Umwelt" [Refuse incineration and the environment], volume 4 by Prof. Dr. Ing. Karl J. Thomé-Kozmiensky from EF Verlag für Energie und Umwelttechnik GmbH, Berlin (1990), pages 339 to 359. On page 350, separation of these heavy metals from the residual melt by density separation is suggested, reference being made to other electrofusion processes, but without giving a further description of this method.

Building on this basis, a method is disclosed in German Patent DE-C-41 17 444, in which the solid residues such as grate ash, boiler ash and filter dust from a waste incineration plant are stored temporarily in a stock bunker and are freed of ferrous scrap by a magnetic separator. This scrap is then mechanically comminuted. Obviously, to discard ferrous scrap and other relatively large parts, the slag must be substantially cooled, or cooling must at least be performed during storage. The (cooled) solid residues are then fed to a melt furnace, in which they are continuously melted with supply of energy. At the bottom of this melt furnace, the metals-enriched melt is taken off batchwise and the residual melt is taken off at a side wall of the melt furnace and cooled, which produces a vitreous product.

A similar method is disclosed by EP-A-93104418.4, in which the residues from refuse or waste incineration having a temperature between 600 and 900° C. are cooled to about 80° C. by discharge into water and are stored temporarily in a bunker. In a reactor, the residues are heated to a temperature of above 1000° C., as a result of which the volatile metals and metal compounds escape in the gaseous state. The compounds of metallic elements, in particular heavy metals, are first oxidized and then reduced. Iron and the metals soluble in iron are collected in a melt in the reactor. From the remaining slag, an environmentally compatible product is said to form having latent hydraulic and/or pozzolanic properties, for which the slag removed from the reactor in the molten state is quenched and granulated. This product is admixed to cement or concrete as a mineral binder. The reactor described is a tiltable converter which is spherical and contains the metal melt in the lower region and the residual melt above this. The molten slag or residual melt is to be taken off first from a conically tapering mouthpiece at the top of the converter by gradual tilting and then the metal bath or the metal melt is to be poured into a suitable pan for further transport.

The solutions specified in the abovementioned publications for treating the solids residues from refuse incineration plants for reuse have the disadvantage, inter alia, that many different intermediate steps, such as temporary storage and magnetic separation of magnetic metals, are necessary, moreover, the glass obtained still contains metals.

The object therefore underlying the present invention is to propose a method and apparatus for the removal of the heavy metals from the solid residues which are produced in a refuse incineration plant.

This and other objects of the invention have been achieved by providing a method for processing solid residues from a refuse incineration plant, wherein the solid residues contain a slag and heavy metals, which method includes transferring the residues into a first heating chamber having oxidizing conditions and melting the residue to a melt, whereby at least part of the residue is oxidized; transferring the melt into a second heating chamber having reducing conditions and reducing the melt such that the oxidized heavy metals are reduced to heavy metals in their metallic form; transferring the melt into a third heating chamber wherein the heavy metals in metallic form are sedimented in the second and third heating chamber; removing the thus sedimented heavy metals in metallic form from the second and third heating chambers; and taking off the melt having a diminished amount of heavy metals from the third heating chamber.

The partition according to the invention into three furnace zones enables a substantially improved separation of the heavy metals from the melt. At the same time, the energy consumption is considerably lower than in the abovementioned methods and plants. In addition, the various methods such as oxidation, reduction and settling of the residual melt can be particularly well managed by this means. The flexibility of the method also makes immediate adaptation possible in the event of a changed slag composition. Because the treatment according to the invention preferably takes place adjacently to the refuse incineration plant and the solid residues are fed in the hot state directly to the treatment plant, considerable energy savings result.

The gaseous substances formed in the first heating chamber during the melting and oxidation process can be recycled into the refuse incineration furnace in counter-current to the descending slag. Since these gases generally have a temperature of 1100° C. to 1600° C., the temperature in the refuse incineration compartment, in particular in the lower part of the grate, is greatly increased, so that complete consumption and increased efficiency are achieved. These gases then pass together with the gases from the refuse incineration plant to an exhaust gas cleaner, so that separate exhaust gas cleaning is not necessary for the first heating chamber.

Further preferred embodiments of the invention are the subject-matter of the dependent claims 2 to 9 and 11 to 18. Additional advantages of the invention can be taken from the description below.

The invention is now described in more detail with reference to the examples given in the drawings. Purely diagrammatically:

In the figures, the same reference numbers denote the same elements, so that explanations to FIG. 1 also apply to FIG. 2, unless stated otherwise.

Figure 1:
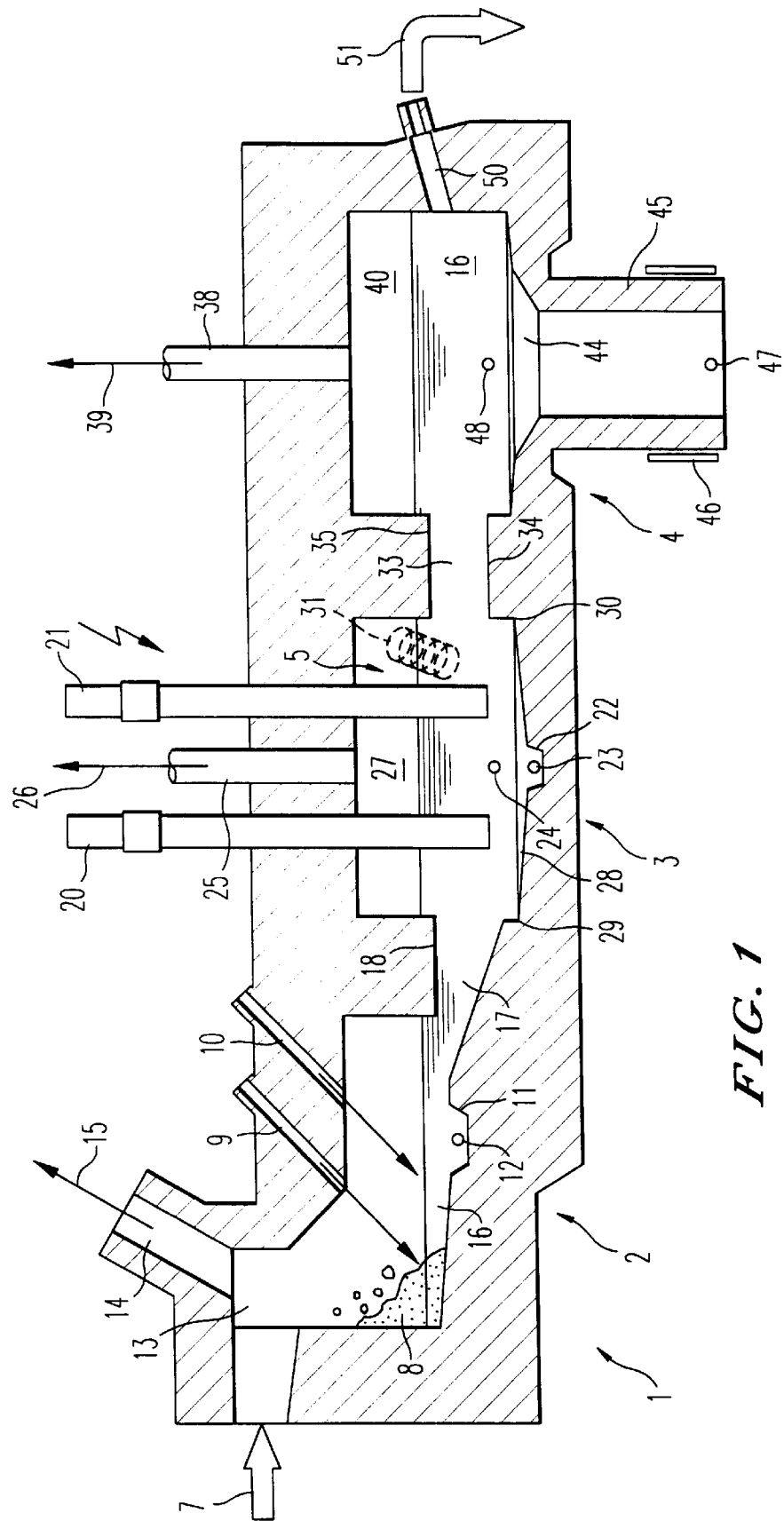
FIG. 1 shows a first embodiment according to the invention.

In FIG. 1, a melt furnace 1 having three cylindrical heating chambers 2, 3 and 4 is depicted. A slide, which is indicated by the arrow 7 and which comes from a refuse incineration plant not depicted here opens out into the first heating chamber 2. The slag from the refuse incineration is added to a heap 8 via the slide 7. Two inclined oil- or gas-fuelled oxygen burners 9 and 10 opening out in to the first heating chamber 2 are provided as a heating device in the upper area, which oxygen burners heat the slag to a temperature of generally 1400° C. to 1600° C., preferably around 1550° C. However, a different type of heater can be used, such as an electric heater, oxygen being simultaneously fed to the slag. In addition, a fossil-fuelled heater with preheated air can be used. In the lower or bottom area of the first heating chamber 2, a conical collection shaft 11 having a tapping port 12 is provided, via which liquid metals can be taken off periodically and via which the first heating chamber 2 can be emptied for inspection work.

In its cross-section, the first heating chamber 2 is constructed as recumbent L and has a so-called upper furnace 13 in the shorter section of the L. In this upper furnace 13, an exhaust gas duct 14 is attached, which recycles the gaseous substances, which are formed in the heating and are indicated by the arrow 15, into the refuse incineration plant combustion compartment, which is not depicted here. These hot gaseous substances 15 contribute considerably to a temperature elevation in the (not depicted) refuse incineration compartment, in particular in the lower part of the grate, so that, here, virtually complete combustion of the refuse takes place.

The melt 16 runs via a first heated throat 17 into the second heating chamber 3, which is somewhat lower than the first heating chamber 2, so that the melt 16 cannot flow back. In the upper area of the throat 17 there is provided a skimming rib 18 which retains the gall floating on the melt 16 and which ensures the separation of the gas spaces in the two heating chambers 2 and 3 above the melt 16. Three or four vertical heating electrodes, of which only two 20 and 21 are depicted, are arranged from the top in this second heating chamber 3, which electrodes, as a resistance heater, keep the temperature of the melt 16 constant. The heating electrodes 20, 21 are graphite electrodes having good electrical conductivity. Instead of the type of heater shown, other direct current or alternating current heaters can be used.

In the bottom area of this second heating chamber 3 there is likewise provided a conical collection shaft 22 having a tapping port 23 in order to be able to tap off at a suitable point periodically, i.e. discontinuously, the melt 16 collected there of iron and heavy metals and metal compounds, in particular nickel, chromium and copper, in an iron bath 28.

Above the tapping port 23, a further outlet orifice 24 is provided which enables the second heating chamber 3 to be emptied for inspection work or the like.

In the upper area of the second heating chamber 3, termed upper furnace 27, an exhaust duct 25 is mounted for escaping gaseous substances, such as heavy metal vapours, indicated by the arrow 26. The iron bath 28 situated in the melt 16 is delimited in the second heating chamber 3 by two projecting shoulders 29 and 30. A conveyor screw 31 is further indicated in dashed lines, which opens out gastightly into the second heating chamber 3 and which serves for introducing further finely divided residues from the refuse incineration plant, such as fly ash and boiler ash and filter dusts.

A second heated throat 33 having constant cross-section passes the melt 16 over into the third heating chamber 4. This throat 33 has at the bottom a threshold 34, which forms on the left the projecting shoulder 30 in the second heating chamber 3, and at the top has a skimming rib 35 in order to retain further gall on the melt 16. In the upper area of the third heating chamber 4, also termed upper furnace 40, an exhaust duct 38 is provided for the escaping gaseous substances indicated by the arrow 39. An iron bath 44 of sedimented molten heavy metals is situated in a cylindrical vessel 45 which is provided in the lower area of the third heating chamber 4. The iron bath 44 is inductively heated by means of external coils 46. The hot metal gives up its heat to the overlying melt 16 and thus ensures the maintenance of the temperature in the melt 16. In the lower area of the vessel 45, the iron bath 44 is likewise periodically tapped via a tapping port 47. For inspection work or the like, a further outlet port 48 is provided in the upper area of the third heating chamber 4. On the right-hand side of the third heating chamber 4, an outlet 50 is provided, which is constructed as a syphon and runs upwards at a slight incline, in order to take off the glass melt 16 freed of heavy metals. The melt is then continuously passed into a bath, not depicted here, containing cooling liquid, for example water, and quenched there. This forms vitreous granules, which can be used as building material, in particular as clinker substitute in the cement industry.

The exhaust ducts 25 and 38 in the second and third heating chambers 3 and 4 can each be connected to a separate exhaust gas cleaning device or, together, can be connected to a shared exhaust gas cleaning device (not depicted here).

Figure 2:
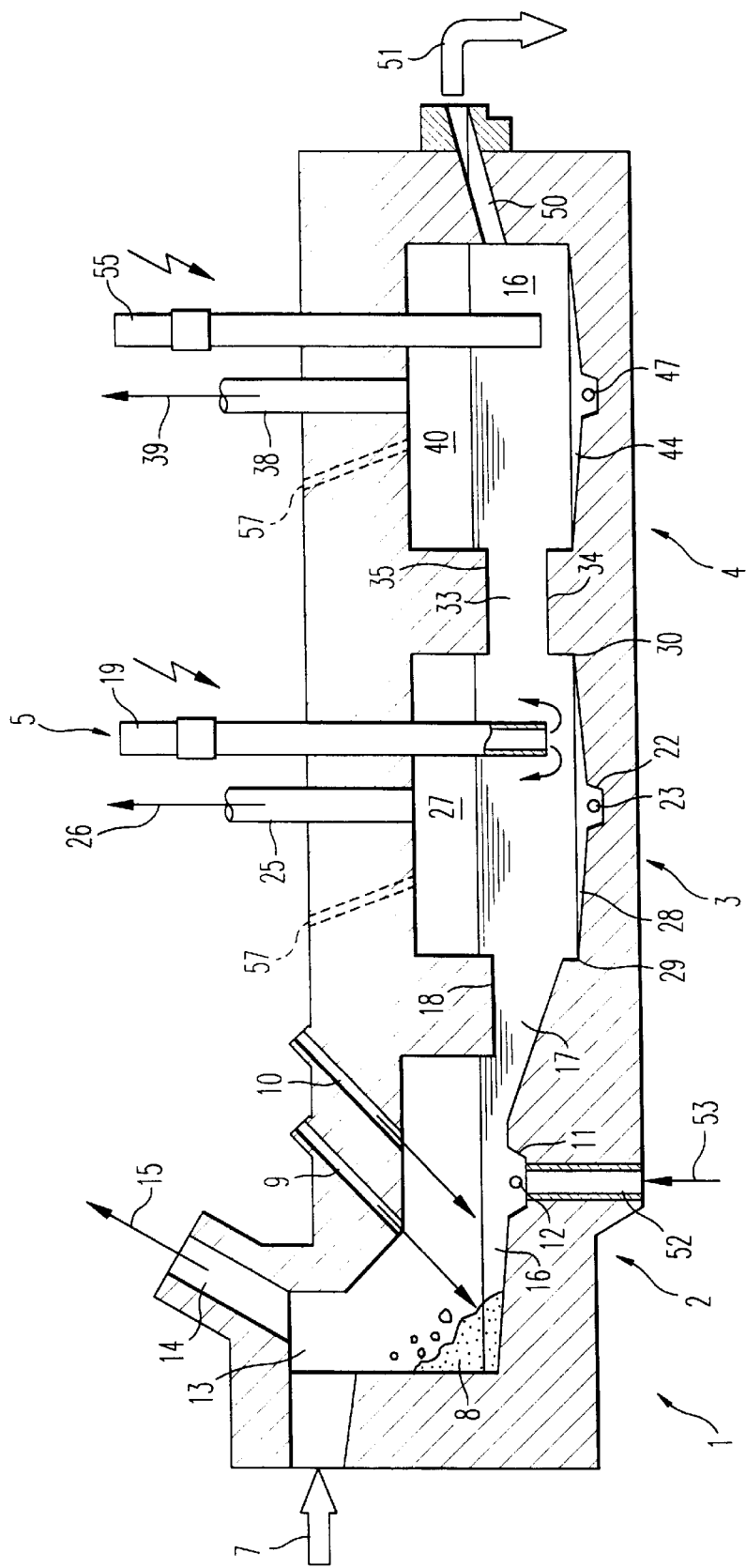
FIG. 2 shows a second embodiment according to the invention.

The melting furnace 1 depicted in FIG. 2 is essentially the same in construction as that depicted in FIG. 1, so that only the elements which are changed or additional are described in more detail. In the bottom area of the first heating chamber 2, a diagrammatically indicated nozzle orifice 52 is arranged, through which additional oxygen indicated by the arrow 53 is fed, in order to effect the oxidation of molten melts in the conical collection shaft 11. Instead of the nozzle orifices, lances for this oxygen feed can alternatively be provided. In addition, in the second heating chamber 3, one of the vertical graphite electrodes 19 is constructed as a hollow cylinder. Through the hollow cylindrical heating electrode 19, fly ash and boiler ash and filter dust from the refuse incineration plant can be introduced, which thus pass into the melt 16 and thus are likewise incorporated into the glass matrix subsequently formed. The third heating chamber 4 is likewise equipped with a graphite electrode 55 as a resistance heater, by means of which the heating chamber is kept at the required temperature of, e.g. 1300° C. to 1500° C. In this case, the third heating chamber 4 is constructed without cylindrical vessel 45 and the tapping port 47 is arranged higher than in FIG. 1. A reducing protective gas, or a protective gas which is inert with respect to the melt 16 can further additionally be introduced via lances 57, which are constructed as thin tubes and indicated merely as dashed lines, in the upper area of the second heating chamber 3 and the third heating chamber 4, in order to prevent reoxidation of heavy metals. These lances 57 can likewise be provided at a corresponding point of the heating chambers 3 and 4 in FIG. 1. Otherwise, the construction of this melting furnace 1 is identical to that of FIG. 1.

The manner in which the above described melting furnace 1 functions is now as follows:

The hot slag from the refuse incineration plant is heated in the first heating chamber 2 to a temperature, for example, of about 1550° C., as a result of which the solid residues of the slag melt. At the same time, organic constituents of the slag are burned and metals and/or metal compounds are oxidized. The oxidic constituents of the hot slag melt very rapidly in the first heating chamber 2 and the metals contained in the slag, principally iron, which are not oxidized during melting, sink owing to the difference in density into the conical collection shaft 11. In addition, oxygen can be introduced into the first heating chamber 2 through the nozzle orifice 52 (FIG. 2) or other feed elements. This achieves a complete oxidation of the metals and metal compounds. The heat of reaction released in the process is utilized for melting the slag in the first heating chamber 2.

The metal melt is then tapped at the tapping port 12. The hot gases 15 formed in the melting and oxidation method in the first heating chamber 2 are fed to the combustion compartment of the refuse incineration plant via the exhaust duct 14 in counter-current to the descending slag. Since the hot gases 15 have a temperature of 1100° C. to 1600° C., they effect an increase in the temperature in the refuse incineration compartment, in particular in the lower part of the grate, which leads to complete combustion and a higher thermal efficiency of the plant. The hot gases 15 pass, together with the refuse incineration gases, into the exhaust gas cleaning system, so that separate exhaust gas cleaning is not necessary for the first heating chamber 2.

The melt 16, in which heavy metal oxides and iron oxides are dissolved, then passes via the (possibly heated) throat 17 into the second heating chamber 3. The upper furnace 27 over the melt 16 is hermetically sealed off from the upper furnace 13 of the first heating chamber 2 by the skimming rib 18. The melt 16 is impinged with a reducing atmosphere in this area via the lance 57 (FIG. 2). In the heating chamber 3, reducing agents are added to the melt 16 which initially reduce more noble metal oxides and then iron oxide to metal. The metals vaporize and/or sink, owing to their high density, into the conical collection shaft 22.

The redox methods are actively supported by the strong convection currents starting from the heating electrodes 20 and 21 (FIG. 1) or 19 (FIG. 2). The degree of reduction of the melt 16 can be set by the amount of the reducing agents. The vaporized heavy metals cannot reoxidize in the upper furnace 27 hermetically sealed off from the outside and set to have reducing conditions. The vaporized heavy metals are taken off there via the exhaust duct 25 and are separated out in a separate cleaning system (not depicted here). They are then present in concentrated form and are reused. The settled metals, principally copper-iron heavy metal alloys, can be tapped via the tapping port 23 in the conical collection shaft 22.

Further, finely divided residues such as fly ash and boiler ash and filter dust or the like from the residue incineration plant can be introduced via the conveyor screw 31 (FIG. 1) or via the hollow heating electrode 19 (FIG. 2). In order to introduce these fine residues from the refuse incineration into the melt 16 in a dust-free manner, these can be compressed to form pill-shaped or spherical mouldings in a press device, which is not further depicted or described here and only then introduced via the conveyor screw 31 (FIG. 1) or via the hollow heating electrode 19 (FIG. 2). These finely divided residues may be melted in an additional heating chamber (5) and introduced into the second heating chamber through the conveyor screw (31) or the hollow heating electrode (19), as shown in FIGS. 1 and 2, respectively. The heavy metal oxides contained in the fly ash and in the filter dust are also reduced to the metal in the second heating chamber 3.

The melt 16 passes out of the second heating chamber 3 via the (optionally heated) throat 33 into the third heating chamber 4. In this heating chamber 4, the residence time and thus the period for residual reduction of the heavy metal oxides are to be increased. If necessary, special reducing agents can be further fed via the lance 57 (FIG. 2). Volatile heavy metals further produced in the residual reduction vaporize and are removed as gaseous substances 39 via the exhaust duct and fed to a cleaning system. These gaseous substances 39 can be removed and cleaned together with the heavy metal vapours or gaseous substances 26 from the second heating chamber 3.

The melt 16 of the non-volatile heavy metals, principally iron and copper, sinks in the cylindrical vessel 45 (FIG. 1) or in the collection shaft 43 (FIG. 2) and is tapped there as reduced iron at the tapping port 47. However, some can also flow back into the second heating chamber 3 and can be tapped there. The slag melt 16 substantially freed of heavy metals finally flows via the submerged syphon 51 to the granule production.

The heating electrodes 19, 20, 21 and 55 can each be made of carbon (graphite) or molybdenum. If they are made of carbon, the vertical introduction of the heating electrodes shown in the respective heating chamber 3 or 4 has the advantage that, in the case of advanced oxidation of the heating electrode, i.e. consumption, they can be gradually further thrust into the heating chamber and thus this leads to heating of the melt with constant power with respect to time.

Although the cylindrical shape is preferred for the heating chambers 2, 3 and 4, other shapes can alternatively be used by all means.

The fly ash and boiler ash and the filter dust can, if desired, also be introduced into the first heating chamber 2. In this case, they are to be subjected in advance to an acid scrubbing or reduction melting for partial removal of metals.

We claim:

1. Method for processing solid residues from a refuse incineration plant, wherein the solid residues contain a slag and heavy metals, comprising:

(a) transferring the solid residues into a first heating chamber having oxidizing conditions and melting the residues to a melt wherein at least a part of the residues are oxidized;

(b) transferring the melt into a second heating chamber having reducing conditions and reducing the melt wherein at least a part of the oxidized residues are oxidized heavy metals and are reduced to metallic heavy metals;

(c) transferring the melt into a third heating chamber wherein the metallic heavy metals are sedimented in the second heating chamber and the third heating chamber;

(d) removing the sedimented metallic heavy metals from the second heating chamber and the third heating chamber; and (e) removing the melt from the third heating chamber.

2. Method according to claim 1, wherein said slag comprises metals that are essentially completely oxidized by injecting oxygen into said first heating chamber.

3. Method according to claim 2, characterized in that the heat of reaction produced in the oxidation of the metals in the first heating chamber is utilized for heating the slag.

4. Method according to claim 2, characterized in that a reducing agent is introduced into the second heating chamber for reduction of the metals.

5. Method according to claim 1, characterized in that the heat of reaction produced in the oxidation of the metals in the first heating chamber is utilized for heating the slag.

6. Method according to claim 1, characterized in that a reducing agent is introduced into the second heating chamber for reduction of the metals.

7. Method according to claim 1, characterized in that finely divided residues selected from the group consisting of fly ash, boiler ash and filter dusts and a mixture thereof are fed to the melt in the second heating chamber.

8. Method according to claim 7, characterized in that the finely divided residues are melted in an additional heating chamber and are introduced as melt into the second heating chamber.

9. Method according to claim 7, characterized in that the finely divided residues are compressed to form compacts before they are fed to the melt in the second heating chamber.

10. Method according to claim 1, characterized in that, in the upper area of the second or the third heating chamber or both, a reducing gas with respect to the melt is introduced.

11. Method according to claim 1, characterized in that gaseous substances produced in the first heating chamber are recycled to the refuse incineration plant.

12. The method according to claim 1, wherein at least a portion of said metals contained in said solid residues are essentially completely oxidized by injecting oxygen into said first heating chamber.

13. An apparatus, comprising
   a first heating chamber having a heating device,
   a second, electrically heatable heating chamber, and
   a third, electrically heatable heating chamber,
   wherein the first and the second heating chambers are connected to one another via a first throat, and the second and the third heating chambers are connected to one another via a second throat,
   wherein said first heating chamber comprises an upper furnace in an upper area of said first heating chamber, the upper area of said first heating chamber being with respect to an interface between a metal melt and a vapor phase within the apparatus, wherein said upper furnace of said first heating chamber comprises at least one downwards pointing oxygen burner,
   wherein the second heating chamber comprises a tapping port for removing said metal melt in a lower area of the second heating chamber, the lower area of said second heating chamber being with respect to an interface between said metal melt and a vapor phase within the apparatus, and
   wherein the third heating chamber comprises aside outlet for removing an essentially heavy-metal-free melt.

14. Apparatus according to claim 10, further comprising a collection shaft for a heavy metal melt in a lower area of said first heating chamber, the lower area of said first heating chamber being with respect to an interface between said metal melt and a vapor phase within the apparatus.

15. The apparatus according to claim 14, wherein said first heating chamber comprises at least one oxygen feed element within said collection shaft.

16. Apparatus according to claim 13, characterized in that the second heating chamber comprises an upper furnace in an upper area of said second heating chamber, the upper area of said second heating chamber being with respect to an interface between said metal melt and a vapor phase within the apparatus,
   wherein said upper furnace in said second heating chamber comprises at least one heating electrode that projects from said upper furnace into said melt.

17. Apparatus according to claim 16, characterized in that said at least one heating electrode is a graphite electrode.

18. Apparatus according to claim 16, characterized in that a closed conveyor screw opens into the second heating chamber and is gas-tight.

19. Apparatus according to claim 10, characterized in that said heating electrode is a hollow cylinder and forms a feed duct for introducing finely divided residues.

20. Apparatus according to claim 13, said third heating chamber comprises a tapping port for removing a metal melt in a lower area of said third heating chamber, the lower area of said third heating chamber being with respect to an interface between said metal melt and a vapor phase within the apparatus.

21. Apparatus according to claim 13, characterized in that the outlet in the third heating chamber has an outer portion and an inner portion, wherein the outer portion is with respect to the interior of the apparatus and the inner portion is with respect to the exterior of the apparatus, wherein the outer portion is inclined with respect to the inner portion, and wherein said outlet further comprises a heatable syphon.

22. The apparatus according to claim 13, wherein the third heating chamber comprises an upper furnace in an upper area of said third heating chamber, the upper area of said third heating chamber being with respect to an interface between said metal melt and a vapor phase within the apparatus,
   wherein said upper furnace of said third heating chamber comprises at least one heating electrode that projects from said upper furnace of said third heating chamber into said melt.

23. The apparatus according to claim 22, wherein said heating electrode is a graphite electrode.

24. The apparatus according to claim 22, wherein said heating electrode is a hollow cylinder and forms a feed duct for introducing finely divided residues.

25. The apparatus according to claim 13, wherein said third heating chamber comprises a vessel in a lower area of said third heating chamber, the lower area of said third heating chamber being with respect to an interface between said metal melt and a vapor phase within the apparatus, wherein the vessel comprises an external coil to inductively heat the metal melt.

* * * * *